United States Patent
Muramatsu

(10) Patent No.: US 11,407,463 B2
(45) Date of Patent: Aug. 9, 2022

(54) HEADLAMP DEVICE INCLUDING HEADLAMP AND PAIR OF CORNERING LAMPS

(71) Applicant: YAMAHA HATSUDOKI KABUSHIKI KAISHA, Iwata (JP)

(72) Inventor: Kenichi Muramatsu, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 0 days.

(21) Appl. No.: 17/202,462

(22) Filed: Mar. 16, 2021

(65) Prior Publication Data

US 2021/0300493 A1 Sep. 30, 2021

(30) Foreign Application Priority Data

Mar. 31, 2020 (JP) .............................. JP2020-065122

(51) Int. Cl.
| | |
|---|---|
| *B62J 6/023* | (2020.01) |
| *F21S 41/20* | (2018.01) |
| *F21S 41/60* | (2018.01) |
| *B62J 6/026* | (2020.01) |
| *F21W 107/17* | (2018.01) |
| *F21W 102/19* | (2018.01) |

(52) U.S. Cl.
CPC .............. *B62J 6/023* (2020.02); *B62J 6/026* (2020.02); *F21S 41/28* (2018.01); *F21S 41/60* (2018.01); *F21W 2102/19* (2018.01); *F21W 2107/17* (2018.01)

(58) Field of Classification Search
CPC . B62J 6/026; B62J 6/023; F21S 41/60; F21W 2107/17
See application file for complete search history.

(56) References Cited

U.S. PATENT DOCUMENTS

2020/0017164 A1 1/2020 Saeki

FOREIGN PATENT DOCUMENTS

| | | |
|---|---|---|
| EP | 2641779 A2 | 9/2013 |
| EP | 2669114 A2 | 12/2013 |
| EP | 2669162 A1 | 12/2013 |
| EP | 2792585 A1 | 10/2014 |
| JP | 2011134731 A | 7/2011 |
| JP | 2013134955 A | 7/2013 |
| JP | 2015137031 A | 7/2015 |
| JP | 2020006876 A | 1/2020 |
| WO | 2019187427 A1 | 10/2019 |

*Primary Examiner* — Robert J May
(74) *Attorney, Agent, or Firm* — Rabin & Berdo, P.C.

(57) ABSTRACT

A headlamp device for use in a leaning vehicle, including at least one headlamp that emits light in a front direction, and a pair of cornering lamps that emit light to form left-front and right-front light emission areas. Each of the at least one headlamp includes at least one headlamp light source, and a headlamp housing that stores the at least one headlamp light source and that is arranged inside the front cover. Each cornering lamp includes at least one cornering lamp light source, a light travel direction changing member having a light travel direction changing surface that changes a travel direction of light outputted from the at least one cornering lamp light source, and a cornering lamp housing that stores therein the at least one cornering lamp light source and the light travel direction changing member, and that is arranged inside the front cover. The cornering lamp housing and the headlamp housing are separate from each other.

10 Claims, 7 Drawing Sheets

HEADLAMP DEVICE INCLUDING HEADLAMP AND PAIR OF CORNERING LAMPS

CROSS-REFERENCE TO RELATED APPLICATIONS

This application claims priority from a Japanese Patent Application No. 2020-065122, filed on Mar. 31, 2020. The contents of the application are incorporated herein by reference.

TECHNICAL FIELD

The present teaching relates to a headlamp device for use in a leaning vehicle, and specifically to a headlamp device including a headlamp and a left-right pair of cornering lamps.

BACKGROUND ART

A leaning vehicle is conventionally known. The leaning vehicle includes a vehicle body configured to lean in a left direction in turning left and to lean in a right direction in turning right.

The leaning vehicle includes a headlamp device, too. The headlamp device, which is supported by the vehicle body, leans in the left direction together with the vehicle body in turning left, and leans in the right direction together with the vehicle body in turning right.

A headlamp device including a headlamp and a left-right pair of cornering lamps is proposed, for example, by Japanese Patent Application Laid-Open No. 2015-137031 (hereinafter, Patent Document 1). The headlamp emits light toward the front of the vehicle body. The left-right pair of cornering lamps is configured to emit light such that a left-front light emission area visually recognizable by a rider of the leaning vehicle is formed on a road surface at the left-front of the vehicle body when the leaning vehicle turns left, and to emit light such that a right-front light emission area visually recognizable by the rider of the leaning vehicle is formed on a road surface at the right-front of the vehicle body when the leaning vehicle turns right.

In the headlamp device according to Patent Document 1, the left-right pair of cornering lamps are integrated with the headlamp. More specifically, the left-right pair of cornering lamps and the headlamp share a housing. The left-right pair of cornering lamps and the headlamp also share a substrate that supports their respective light sources and a heat sink that facilitates heat dissipation from the respective light sources.

PRIOR ART DOCUMENTS

Patent Documents

Patent Document 1: Japanese Patent Application Laid-Open No. 2015-137031

SUMMARY OF THE INVENTION

Problems to be Solved by the Invention

The left-right pair of cornering lamps are configured such that the same light source is kept turned on so far as the leaning direction of the vehicle body is unchanged, which likely makes heat of the light source be concentrated. The headlamp is kept turned on while being used, and therefore heat of its light source is likely to be concentrated. This is why the headlamp device including the headlamp and the left-right pair of cornering lamps is required to have a layout in which the light source of the headlamp and the respective light sources of the left-right pair of cornering lamps are arranged apart from each other. This results in a size increase of the housing shared by the headlamp and the left-right pair of cornering lamps.

Some types of leaning vehicle include a front cover arranged so as to cover a headlamp device in a front view of the vehicle. A housing of the headlamp device, that is, a housing shared by a headlamp and a left-right pair of cornering lamps, is disposed inside the front cover.

The leaning vehicle including the above-described front cover is required to be compact. In this respect, however, the headlamp device including the headlamp and the left-right pair of cornering lamps involves a size increase of the housing of the headlamp device as mentioned above, and thus making it difficult for the front cover to be compact. In addition, not only the headlamp device but also various components such as electrical system components and brake system components are disposed inside the front cover. These components need to be avoided in designing the housing of the headlamp device. This leads to further upsizing of the housing of the headlamp device, which makes it more difficult for the front cover to be compact.

The present teaching aims to provide a headlamp device and a leaning vehicle including the headlamp device, wherein the headlamp device is for use in a leaning vehicle having a front cover that is arranged so as to cover the headlamp device in a front view of the vehicle, the headlamp device includes a headlamp and a left-right pair of cornering lamps, and the headlamp device allows the front cover to be compact while suppressing concentration of heat emitted from a light source of the headlamp and from respective light sources of the left-right pair of cornering lamps.

Means for Solving the Problems

To attain the foregoing aim, the inventor of the present application conducted studies about a configuration that allows a front cover to be compact in a case where a headlamp device including a headlamp and a left-right pair of cornering lamps is disposed inside the front cover, and consequently found out the following.

In the case where the headlamp device including the headlamp and the left-right pair of cornering lamps is disposed inside the front cover, it is important to: (1) consider an influence of heat emitted from the light source of the headlamp and from the respective light sources of the left-right pair of cornering lamps; and (2) avoid interference of the headlamp device with components that are different from the headlamp device and that are disposed inside the front cover.

Based on the findings above, the inventor of the present application conducted advanced studies, resulting in a discovery that: in the case where the headlamp device including the headlamp and the left-right pair of cornering lamps is disposed inside the front cover, providing the headlamp and the left-right pair of cornering lamps respectively with separate housings instead of providing the headlamp and the left-right pair of cornering lamps with a shared housing allows each of the separate housings of the headlamp and the left-right pair of cornering lamps to be downsized to the minimum required size, and also increases the degree of freedom in arranging the headlamp and the left-right pair of cornering lamps, so that it is possible to allow the front cover to be compact while suppressing concentration of heat emitted from the light source of the headlamp and from the respective light sources of the left-right pair of cornering lamps.

It was not until the present inventor conducted the studies that the above-described discovery was obtained. The present teaching was accomplished based on this discovery.

A headlamp device according to an embodiment of the present teaching is used in a leaning vehicle. The leaning vehicle includes a vehicle body. The vehicle body leans in a left direction when the leaning vehicle turns left. The vehicle body leans in a right direction when the leaning vehicle turns right.

The headlamp device according to the embodiment of the present teaching is supported by the vehicle body. Thus, the headlamp device according to the embodiment of the present teaching leans in the left direction together with the vehicle body when the leaning vehicle turns left, and leans in the right direction together with the vehicle body when the leaning vehicle turns right. The headlamp device according to the embodiment of the present teaching is disposed inside a front cover included in the vehicle body.

The headlamp device according to the embodiment of the present teaching includes a headlamp and a pair of cornering lamps. The headlamp emits light in the front direction of the vehicle body. The pair of cornering lamps emit light such that a single left-front light emission area visually recognizable by a rider of the leaning vehicle is formed on a road surface at the left-front of the vehicle body when the leaning vehicle turns left, and emit light such that a single right-front light emission area visually recognizable by the rider of the leaning vehicle is formed on a road surface at the right-front of the vehicle body when the leaning vehicle turns right.

In the headlamp device according to the embodiment of the present teaching, the headlamp includes at least one headlamp light source and a headlamp housing. The headlamp housing stores the at least one headlamp light source therein. The headlamp housing is arranged inside the front cover so as to allow light outputted from the at least one headlamp light source to be emitted.

In the headlamp device according to the embodiment of the present teaching, the pair of cornering lamps each include at least one cornering lamp light source, a light travel direction changing member, and a cornering lamp housing. The light travel direction changing member is disposed corresponding to the at least one cornering lamp light source. The light travel direction changing member has a single light travel direction changing surface. The single light travel direction changing surface changes a travel direction of light outputted from the at least one cornering lamp light source such that the single left-front light emission area is formed on a road surface at the left-front of the vehicle body when the leaning vehicle turns left, or such that the single right-front light emission area is formed on a road surface at the right-front of the vehicle body when the leaning vehicle turns right. The cornering lamp housing stores therein the at least one cornering lamp light source and the light travel direction changing member. The cornering lamp housing is provided as a member different from the headlamp housing. The cornering lamp housing is separated from the headlamp housing. The cornering lamp housing is arranged inside the front cover so as to allow light outputted from the at least one cornering lamp light source, of which travel direction is then changed by the light travel direction changing surface, to be emitted.

In the foregoing headlamp device, the cornering lamp housing and the headlamp housing disposed inside the front cover are provided as different members, and are arranged separately from each other. This enables each of the cornering lamp housing and the headlamp housing to be downsized to the minimum required size, and also increases the degree of freedom in arranging the cornering lamp housing and the headlamp housing. The cornering lamp housing and the headlamp housing, therefore, can be arranged at appropriate positions without interference with various components such as electrical system components and brake system components that are also disposed inside the front cover. It consequently is possible to allow the front cover to be compact while suppressing concentration of heat emitted from the headlamp light source included in the headlamp and from the cornering lamp light sources included respectively in the pair of cornering lamps.

The leaning vehicle in which the headlamp device according to the embodiment of the present teaching is used may be a vehicle driven by a rider, or may be an autonomous vehicle, for example. The leaning vehicle includes at least one front wheel and at least one rear wheel, for example. In other words, the leaning vehicle does not always have to be a two-wheel vehicle, but may be a three-wheel vehicle of which front wheel or rear wheel is composed of a left-right pair of wheels, or may be a four-wheel vehicle of which front wheel and rear wheel are each composed of a left-right pair of wheels. The leaning vehicle includes at least one steerable wheel and at least one driving wheel, for example. In a leaning vehicle including a front wheel and a rear wheel, either the front wheel or the rear wheel may serve as the steerable wheel. In a leaning vehicle including a front wheel and a rear wheel, either the front wheel or the rear wheel may serve as the driving wheel. The leaning vehicle includes a driving source that generates power for making the leaning vehicle travel, for example. The driving source may be an engine, an electric motor, or a combination of an engine and an electric motor, for example. In a case of the driving source being the engine, the leaning vehicle may include a supercharging mechanism, for example. The supercharging mechanism may be either a turbocharger or a supercharger, for example.

The headlamp device according to the embodiment of the present teaching may be used in a leaning vehicle of which vehicle body is caused to lean either by a rider's weight shifting or the like or by power transmitted from an actuator provided in the leaning vehicle, for example. The vehicle body caused to lean by a rider's weight shifting or the like is a vehicle body configured to increase the lean angle as the gravity acts thereon, for example. The actuator that causes the vehicle body to lean may be an actuator configured to assist a rider in performing an action of leaning the vehicle body, or may be an actuator configured to cause the vehicle body to lean in response to a rider's inputting an operation of leaning the vehicle body, for example. The vehicle body includes a vehicle body frame. The vehicle body frame may be a frame composed of two or more components in combination, or may be a frame composed of two or more components integrally molded. A material of the vehicle body frame may be a metal such as aluminum or iron, a synthetic resin such as CFRP, or a combination of them. The vehicle body frame may be constituted by an exterior component of the leaning vehicle (monocoque structure), or may partially serve as an exterior component of the leaning vehicle (semimonocoque structure).

In the headlamp included in the headlamp device according to the embodiment of the present teaching, how light outputted from the headlamp light source is emitted in the front direction of the vehicle body is not particularly limited. The headlamp may be of projector type, mono-focus type, or reflector type, for example. The headlamp may have a function for emitting a low beam, or may have a function for emitting a high beam, for example. The headlamp may have a function for automatically switching between the low beam and high beam, for example.

In the headlamp device according to the embodiment of the present teaching, the type of the headlamp light source is not particularly limited. The headlamp light source may be a semiconductor laser, an HID (High-Intensity Discharge) valve, a halogen lamp, an incandescent lamp, or the like, for example. Preferably, the headlamp light source is a semiconductor light source such as a light emitting diode or a semiconductor laser. The headlamp light source may be a low beam light source that outputs light for low beam emission, or may be a high beam light source that outputs light for high beam emission.

In the headlamp device according to the embodiment of the present teaching, the headlamp housing is supported by the vehicle body and/or the front cover, for example. The aspect in which the headlamp housing is supported by the vehicle body encompasses an aspect in which the headlamp housing is supported by the vehicle body via a bracket, for example. The headlamp housing may include an outer lens that allows light outputted from the headlamp light source to be transmitted therethrough, for example. With this configuration, the headlamp housing includes a headlamp housing body and an outer lens supported by the headlamp housing body, for example.

In the headlamp device according to the embodiment of the present teaching, how the headlamp housing is arranged inside the front cover is not particularly limited, except that the headlamp housing needs to allow light outputted from the at least one headlamp light source to be emitted. The aspect in which the headlamp housing is arranged inside the front cover encompasses an aspect in which, of the headlamp housing, the headlamp housing body that supports the outer lens is covered by the front cover when viewed in a direction perpendicular to the front-back direction of the vehicle body, for example. More specifically, the aspect in which the headlamp housing is arranged inside the front cover encompasses an aspect in which the headlamp housing is arranged inside the front cover such that a gap is formed between the headlamp housing and the front cover when viewed in the back direction of the vehicle body. The aspect in which, of the headlamp housing, the headlamp housing body that supports the outer lens is covered by the front cover when viewed in a direction perpendicular to the front-back direction of the vehicle body encompasses an aspect in which, of the headlamp housing, the headlamp housing body that supports the outer lens is covered by the front cover when viewed in a specific one of the directions perpendicular to the front-back direction of the vehicle body. The specific one of the directions perpendicular to the front-back direction of the vehicle body may be the up direction of the vehicle body, the down direction of the vehicle body, the left direction of the vehicle body, or the right direction of the vehicle body, for example.

In the headlamp device according to the embodiment of the present teaching, the single left-front light emission area that is formed on a road surface at the left-front of the vehicle body when the leaning vehicle turns left may become larger as the lean angle of the vehicle body included in the leaning vehicle increases, for example. The size of the single left-front light emission area can be adjusted by changing the quantity of light to be outputted from the at least one cornering lamp light source, for example.

In the headlamp device according to the embodiment of the present teaching, the single right-front light emission area that is formed on a road surface at the right-front of the vehicle body when the leaning vehicle turns right may become larger as the lean angle of the vehicle body included in the leaning vehicle increases, for example. The size of the single right-front light emission area can be adjusted by changing the quantity of light to be outputted from the at least one cornering lamp light source, for example.

In the headlamp device according to the embodiment of the present teaching, the type of the at least one cornering lamp light source is not particularly limited. The at least one cornering lamp light source may be a semiconductor laser, an HID (High-Intensity Discharge) valve, a halogen lamp, an incandescent lamp, or the like, for example. Preferably, the at least one cornering lamp light source is a semiconductor light source such as a light emitting diode or a semiconductor laser. The at least one cornering lamp light source outputs light if the lean angle of the vehicle body becomes equal to or greater than a predetermined lean angle while the leaning vehicle is turning, for example.

In the headlamp device according to the embodiment of the present teaching, the light travel direction changing member is just required to have a function for changing the travel direction of light outputted from the at least one cornering lamp light source. The aspect of changing the travel direction of light outputted from the at least one cornering lamp light source encompasses an aspect in which the light travel direction changing surface included in the light travel direction changing member reflects light outputted from the at least one cornering lamp light source, for example. For instance, the light travel direction changing member may be: a reflector including a single reflector surface for reflecting light outputted from the at least one cornering lamp light source; a light guide member on which light from the at least one cornering lamp light source is incident, the light guide member being configured to cause the light incident thereon to be totally reflected therein, to output the resulting light toward the front of the leaning vehicle; or a lens on which light from the at least one cornering lamp light source is incident, the lens being configured to cause the light incident thereon to be refracted, to output the resulting light toward the front of the leaning vehicle.

In the headlamp device according to the embodiment of the present teaching, the cornering lamp housing is supported by the vehicle body and/or the front cover, for example. The aspect in which the cornering lamp housing is supported by the vehicle body encompasses an aspect in which the cornering lamp housing is supported by the vehicle body via a bracket, for example. The cornering lamp housing may include an outer lens that allows light outputted from the cornering lamp light source to be transmitted therethrough, for example. With this configuration, the cornering lamp housing includes a cornering lamp housing body and an outer lens supported by the cornering lamp housing body, for example.

In the headlamp device according to the embodiment of the present teaching, how the cornering lamp housing is arranged inside the front cover is not particularly limited, except that the cornering lamp housing needs to allow light outputted from the at least one cornering lamp light source to be emitted. The aspect in which the cornering lamp housing is arranged inside the front cover encompasses an aspect in which, of the cornering lamp housing, the cornering lamp housing body that supports the outer lens is covered by the front cover when viewed in a direction perpendicular to the front-back direction of the vehicle body, for example. More specifically, the aspect in which the cornering lamp housing is arranged inside the front cover encompasses an aspect in which the cornering lamp housing is arranged inside the front cover such that a gap is formed between the cornering lamp housing and the front cover when viewed in the back direction of the vehicle body. The aspect in which, of the cornering lamp housing, the cornering lamp housing body that supports the outer lens is covered by the front cover when viewed in a direction perpendicular to the front-back direction of the vehicle body encompasses an aspect in which, of the cornering lamp housing, the cornering lamp housing body that supports the outer lens is covered by the front cover when viewed in a specific one of the directions perpendicular to the front-back direction of the vehicle body. The specific one of the directions perpendicular to the front-back direction of the vehicle body may be the up direction of the vehicle body, the down direction of the vehicle body, the left direction of the vehicle body, or the right direction of the vehicle body, for example.

In the headlamp device according to the embodiment of the present teaching, the pair of cornering lamps may further include an aiming mechanism. The aiming mechanism adjusts a travel direction of light that is emitted so as to form the single left-front light emission area as well as a travel direction of light that is emitted so as to form the single right-front light emission area. The cornering lamp housing included in one of the pair of cornering lamps may be integrated with the cornering lamp housing included in the other of the pair of cornering lamps.

In the foregoing headlamp device, the cornering lamp housings included respectively in the pair of cornering lamps are integrated with each other, and therefore simultaneous aiming at the pair of cornering lamps is enabled.

In the headlamp device according to the embodiment of the present teaching, the aiming mechanism includes a bracket for supporting the at least one cornering lamp light source and the light travel direction changing member that are included in each of the pair of cornering lamps, for example. With this configuration, how the aiming mechanism adjusts the travel direction of light that is emitted so as to form the single left-front light emission area as well as the travel direction of light that is emitted so as to form the single right-front light emission area encompasses changing a manner in which the bracket is attached to the cornering lamp housing, for example. How the bracket supports the light travel direction changing member encompasses an aspect in which the light travel direction changing member is integrated with the bracket, for example. It may be acceptable that a heat sink for facilitating heat dissipation from the at least one cornering lamp light source is integrated with the bracket, for example.

In the headlamp device according to the embodiment of the present teaching, the pair of cornering lamps and the headlamp may be arranged one above the other in the up-down direction of the vehicle body when viewed in the front direction or the back direction of the vehicle body. The lower end of an upper lamp may be located upward of the upper end of a lower lamp. The upper lamp being defined as either one of the pair of cornering lamps or the headlamp, which is arranged higher in the up-down direction of the vehicle body. The lower lamp being defined as either one of the pair of cornering lamps or the headlamp, which is arranged lower in the up-down direction of the vehicle body.

In the foregoing headlamp device, the pair of cornering lamps and the headlamp are arranged one above the other in the up-down direction of the vehicle body, which can reduce the length of the front cover in the left-right direction of the vehicle body as compared to when the pair of cornering lamps and the headlamp are arranged side by side with each other in the left-right direction of the vehicle body. Consequently, the front cover can be compact.

In the headlamp device according to the embodiment of the present teaching, the upper lamp may be the pair of cornering lamps, and the lower lamp may be the headlamp.

In the foregoing headlamp device, the left-right pair of cornering lamps are arranged upward of the headlamp. Therefore, in arranging the left-right pair of cornering lamps, it is not necessary to consider a clearance from a front wheel or a front fork, for example. This allows the left-right pair of cornering lamps to be arranged closer to each other in the left-right direction of the vehicle body. Consequently, the front cover can be compact.

In the headlamp device according to the embodiment of the present teaching, the pair of cornering lamps may be a left-right pair of cornering lamps arranged side by side in the left-right direction of the vehicle body. The headlamp may be a left-right pair of headlamps arranged side by side in the left-right direction of the vehicle body.

In the foregoing headlamp device, housings of the cornering lamps are arranged separately in the left-right direction of the vehicle body, and housings of the headlamps are arranged separately in the left-right direction of the vehicle body. It therefore is not necessary to arrange light sources of the cornering lamps apart from each other and arrange light sources of the headlamps apart from each other in consideration of an influence of heat emitted from the light sources of the cornering lamps and from the light sources of the headlamps. Thus, the housings of the cornering lamps and the housings of the headlamps can be compact. This makes it easy to arrange the housings of the cornering lamps and the housings of the headlamps without interference with other components that are also disposed inside the front cover. Consequently, the front cover can be compact.

In the headlamp device according to the embodiment of the present teaching, each of the left-right pair of cornering lamps may further include a cornering lamp outer lens. The cornering lamp outer lens is disposed corresponding to the light travel direction changing member. The cornering lamp outer lens allows light outputted from the at least one cornering lamp light source, of which travel direction is then changed by the single light travel direction changing surface, to be transmitted therethrough such that the single left-front light emission area is formed on a road surface at the left-front of the vehicle body when the leaning vehicle turns left or such that the single right-front light emission area is formed on a road surface at the right-front of the vehicle body when the leaning vehicle turns right. Each of the left-right pair of headlamps may include the at least one headlamp light source, and a headlamp outer lens that allows light outputted from the at least one headlamp light source to be transmitted therethrough. The length of the cornering lamp outer lens in the left-right direction of the vehicle body is larger than the length of the headlamp outer lens in the left-right direction of the vehicle body.

In the foregoing headlamp device, the respective housings of the left-right pair of headlamps can be more compact. Consequently, the front cover can be still more compact.

In the headlamp device according to the embodiment of the present teaching, the right end of the cornering lamp outer lens included in a left cornering lamp may be located closer to the center of the vehicle body in the left-right direction than the right end of the headlamp outer lens included in a left headlamp is, the left cornering lamp being a left one of the left-right pair of cornering lamps, the left headlamp being a left one of the left-right pair of headlamps. The left end of the cornering lamp outer lens included in a right cornering lamp may be located closer to the center of the vehicle body in the left-right direction than the left end of the headlamp outer lens included in a right headlamp is, the right cornering lamp being a right one of the left-right pair of cornering lamps, the right headlamp being a right one of the left-right pair of headlamps.

In the foregoing headlamp device, the left-right pair of headlamps, which are kept turned on, can be arranged further apart from each other, and therefore it is possible to suppress an influence of heat emitted from the respective light sources of the left-right pair of headlamps.

In the headlamp device according to the embodiment of the present teaching, the left end of the cornering lamp outer lens included in the left cornering lamp may be located closer to the center of the vehicle body in the left-right direction than the left end of the headlamp outer lens included in the left headlamp is. The right end of the cornering lamp outer lens included in the right cornering lamp may be located closer to the center of the vehicle body in the left-right direction than the right end of the headlamp outer lens included in the right headlamp is.

In the foregoing headlamp device, the left-right pair of headlamps, which are kept turned on, can be arranged further apart from each other, and therefore it is possible to suppress an influence of heat emitted from the respective light sources of the left-right pair of headlamps.

In the headlamp device according to the embodiment of the present teaching, each of the pair of cornering lamps may further include at least one position lamp light source. A travel direction of light outputted from the at least one position lamp light source may be changed by the light travel direction changing surface included in the light travel direction changing member.

In the headlamp device according to the embodiment of the present teaching, each of the pair of cornering lamps may further include a light guide member that causes light outputted from the at least one position lamp light source to exit frontward. The light guide member may be fixed to the outer lens, for example.

In the headlamp device according to the embodiment of the present teaching, each of the pair of cornering lamps may further include a partition member for isolation between light outputted from the at least one cornering lamp light source and light outputted from the at least one position lamp light source. It may be possible that light outputted from the at least one cornering lamp light source or light outputted from the at least one position lamp light source is used to make the edge of the partition member shine. The partition member may be fixed to the outer lens, for example.

In the headlamp device according to the embodiment of the present teaching, the pair of cornering lamps may further include a control device having a control board that controls light output from the at least one cornering lamp light source. This control device may be disposed in a common cornering lamp housing that is structured to integrate the respective cornering lamp housings of the pair of cornering lamps such that the control board extends in the left-right direction of the vehicle body when viewed in the front direction or the back direction of the vehicle body. With respect to the up-down direction of the vehicle body, for example, the position of the control device may be at least partially between the upper end and the lower end of the light travel direction changing member included in each of the left-right pair of cornering lamps, when viewed in the front direction or the back direction of the vehicle body. A connector joint portion of the control device may be positioned between one and the other of the light travel direction changing members included respectively in the left-right pair of cornering lamps, for example.

In the headlamp device according to the embodiment of the present teaching, the light travel direction changing members or the cornering lamp outer lenses included in the pair of cornering lamps may be given reference markers for use in adjusting a travel direction of light that is emitted so as to form the single left-front light emission area and a travel direction of light that is emitted so as to form the single right-front light emission area.

In the headlamp device according to the embodiment of the present teaching, the front cover may include an upper front cover and a lower front cover. The downside front cover is separated from the upside front cover. The downside front cover is arranged downward of the upside front cover when viewed in the front direction or the back direction of the vehicle body. The upper lamp is arranged inside the upside front cover. The lower lamp is arranged inside the downside front cover.

In the foregoing headlamp device, the front cover is split in the up-down direction, and therefore the front cover can be compact. At least one of the upside front cover or the downside front cover may be composed of two or more split front covers arranged side by side in the left-right direction of the vehicle body, for example.

A leaning vehicle according to an embodiment of the present teaching includes a vehicle body and a headlamp device. The vehicle body leans in a left direction when the leaning vehicle turns left. The vehicle body leans in a right direction when the leaning vehicle turns right. The vehicle body includes a front cover. The headlamp device is supported by the vehicle body. Thus, the headlamp device leans in the left direction together with the vehicle body when the leaning vehicle turns left, and leans in the right direction together with the vehicle body when the leaning vehicle turns right. The headlamp device is disposed inside the front cover. The headlamp device is the headlamp device according to the embodiment of the present teaching.

The above and other aims, features, aspects, and advantages of the present teaching will become more apparent from the following detailed description of some embodiments of the present teaching given with reference to the attached drawings.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skilled in the art to which the present teaching belongs.

It will be understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Effects of the Invention

The present teaching can provide a headlamp device and a leaning vehicle including the headlamp device, the headlamp device being for use in a leaning vehicle having a front cover that is arranged so as to cover the headlamp device in a front view of the vehicle, the headlamp device including a headlamp and a left-right pair of cornering lamps, the headlamp device allowing the front cover to be compact while suppressing concentration of heat emitted from a light source of the headlamp and from respective light sources of the left-right pair of cornering lamps.

EMBODIMENTS FOR CARRYING OUT THE INVENTION

In the following, a leaning vehicle according to an embodiment of the present teaching will be detailed with reference to the drawings. The embodiment described below is merely an exemplification. Interpretation of the present teaching should not be limited by the embodiment described below.

Embodiment

Figure 1:
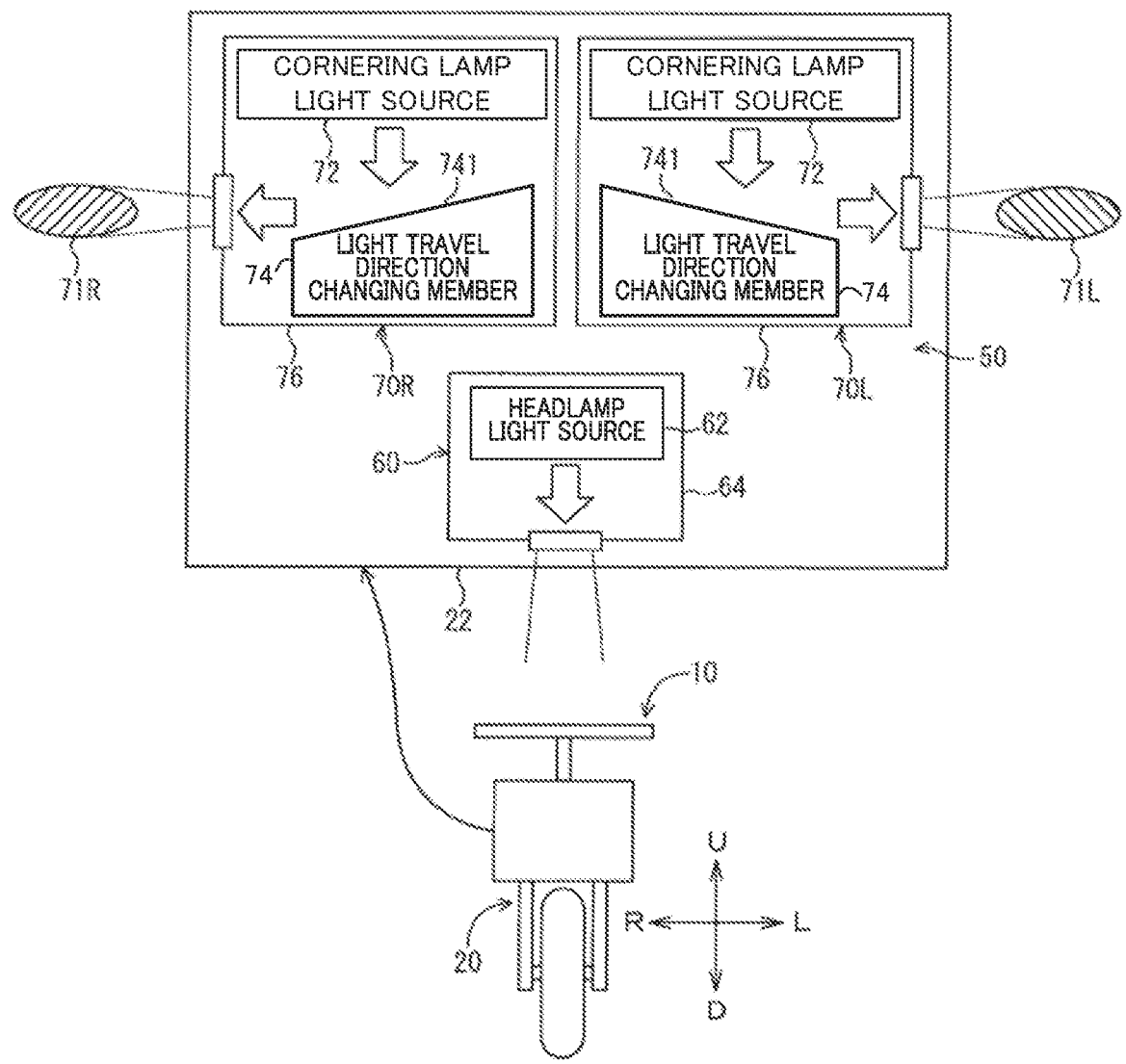
FIG. 1 is an explanatory diagram conceptually showing a leaning vehicle and a headlamp device according to an embodiment of the present teaching.

Referring to FIG. 1, a leaning vehicle 10 and a headlamp device 50 according to an embodiment of the present teaching will be described. FIG. 1 is an explanatory diagram conceptually showing the leaning vehicle 10 and the headlamp device 50.

In the specification herein, directions in relation to the leaning vehicle 10 are defined as follows.

The front direction of the leaning vehicle 10 is defined as front direction F. The back direction of the leaning vehicle 10 is defined as back direction B. The left direction of the leaning vehicle 10 is defined as left direction L. The right direction of the leaning vehicle 10 is defined as right direction R. The up direction of the leaning vehicle 10 is defined as up direction U. The down direction of the leaning vehicle 10 is defined as down direction D. The front-back direction of the leaning vehicle 10 is defined as front-back direction FB. The left-right direction of the leaning vehicle 10 is defined as left-right direction LR. The up-down direction of the leaning vehicle 10 is defined as up-down direction UD. The front, back, up, down, left, and right of the leaning vehicle 10 are respectively the front, back, up, down, left, and right in a view of a rider sitting on a seat (not shown) of the leaning vehicle 10.

The front direction of a vehicle body 20 included in the leaning vehicle 10 is defined as front direction f. The back direction of the vehicle body 20 included in the leaning vehicle 10 is defined as back direction b. The left direction of the vehicle body 20 included in the leaning vehicle 10 is defined as left direction l. The right direction of the vehicle body 20 included in the leaning vehicle 10 is defined as right direction r. The up direction of the vehicle body 20 included in the leaning vehicle 10 is defined as up direction u. The down direction of the vehicle body 20 included in the leaning vehicle 10 is defined as down direction d. The front-back direction of the vehicle body 20 included in the leaning vehicle 10 is defined as front-back direction fb. The left-right direction of the vehicle body 20 included in the leaning vehicle 10 is defined as left-right direction lr. The up-down direction of the vehicle body 20 included in the leaning vehicle 10 is defined as up-down direction ud.

In the leaning vehicle 10, the vehicle body 20 is capable of leaning in the left direction L or in the right direction R. While the vehicle body 20 is leaning in the left direction L or in the right direction R, the up-down direction ud and the left-right direction lr of the vehicle body 20 do not coincide with the up-down direction UD and the left-right direction LR of the leaning vehicle 10. On the other hand, while the vehicle body 20 is upright, the up-down direction ud and left-right direction lr of the vehicle body 20 coincide with the up-down direction UD and the left-right direction LR of the leaning vehicle 10.

Referring to FIG. 1, the leaning vehicle 10 includes the vehicle body 20 and the headlamp device 50. Descriptions of them will follow hereinafter.

The vehicle body 20 leans in the left direction L when the leaning vehicle 10 turns left. The vehicle body 20 leans in the right direction R when the leaning vehicle 10 turns right. The vehicle body 20 includes a front cover 22.

The headlamp device 50 is supported by the vehicle body 20. When the leaning vehicle 10 turns left, the headlamp device 50 leans in the left direction L together with the vehicle body 20. When the leaning vehicle 10 turns right, the headlamp device 50 leans in the right direction R together with the vehicle body 20. The headlamp device 50 is disposed inside the front cover 22.

The headlamp device 50 includes a headlamp 60 and a pair of cornering lamps 70L, 70R. Descriptions of them will follow hereinafter.

The headlamp 60 emits light toward the front of the vehicle body 20. The headlamp 60 includes at least one headlamp light source 62 and a headlamp housing 64. The headlamp housing 64 stores the at least one headlamp light source 62 therein.

When the leaning vehicle 10 turns left, a first cornering lamp out of the pair of cornering lamps 70L, 70R emits light such that a single left-front light emission area 71L visually recognizable by the rider of the leaning vehicle 10 is formed on a road surface at the left-front of the vehicle body 20. When the leaning vehicle 10 turns right, a second cornering lamp out of the pair of cornering lamps 70L, 70R emits light such that a single right-front light emission area 71R visually recognizable by the rider of the leaning vehicle 10 is formed on a road surface at the right-front of the vehicle body 20.

Each one of the pair of cornering lamps 70L, 70R includes at least one cornering lamp light source 72, a light travel direction changing member 74, and a cornering lamp housing 76. Descriptions of them will follow hereinafter.

The light travel direction changing member 74 is disposed corresponding to the at least one cornering lamp light source 72. The light travel direction changing member 74 includes a single light travel direction changing surface 741. The single light travel direction changing surface 741 changes a travel direction of light outputted from the at least one cornering lamp light source 72. More specifically, the single light travel direction changing surface 741 changes the travel direction of light outputted from the at least one cornering lamp light source 72 such that the single left-front light emission area 71L is formed on a road surface at the left-front of the vehicle body 20 when the leaning vehicle 10 turns left, or such that the single right-front light emission area 71R is formed on a road surface at the right-front of the vehicle body 20 when the leaning vehicle 10 turns right.

The cornering lamp housing 76 stores therein the at least one cornering lamp light source 72 and the light travel direction changing member 74. The cornering lamp housing 76 is provided as a member different from the headlamp housing 64. The cornering lamp housing 76 is separated from the headlamp housing 64.

In this leaning vehicle 10, the cornering lamp housing 76 and the headlamp housing 64 disposed inside the front cover 22 are provided as different members, and are arranged separately from each other. This enables each of the cornering lamp housing 76 and the headlamp housing 64 to be downsized to the minimum required size, and also increases the degree of freedom in arranging the cornering lamp housing 76 and the headlamp housing 64. The cornering lamp housing 76 and the headlamp housing 64, therefore, can be arranged at appropriate positions without interference with various components such as electrical system components and brake system components that are also disposed inside the front cover 22. It consequently is possible to allow the front cover 22 to be compact while suppressing concentration of heat emitted from the headlamp light source 62 included in the headlamp 60 and from the cornering lamp light sources 72 included in the pair of cornering lamps 70L, 70R.

Figure 2:
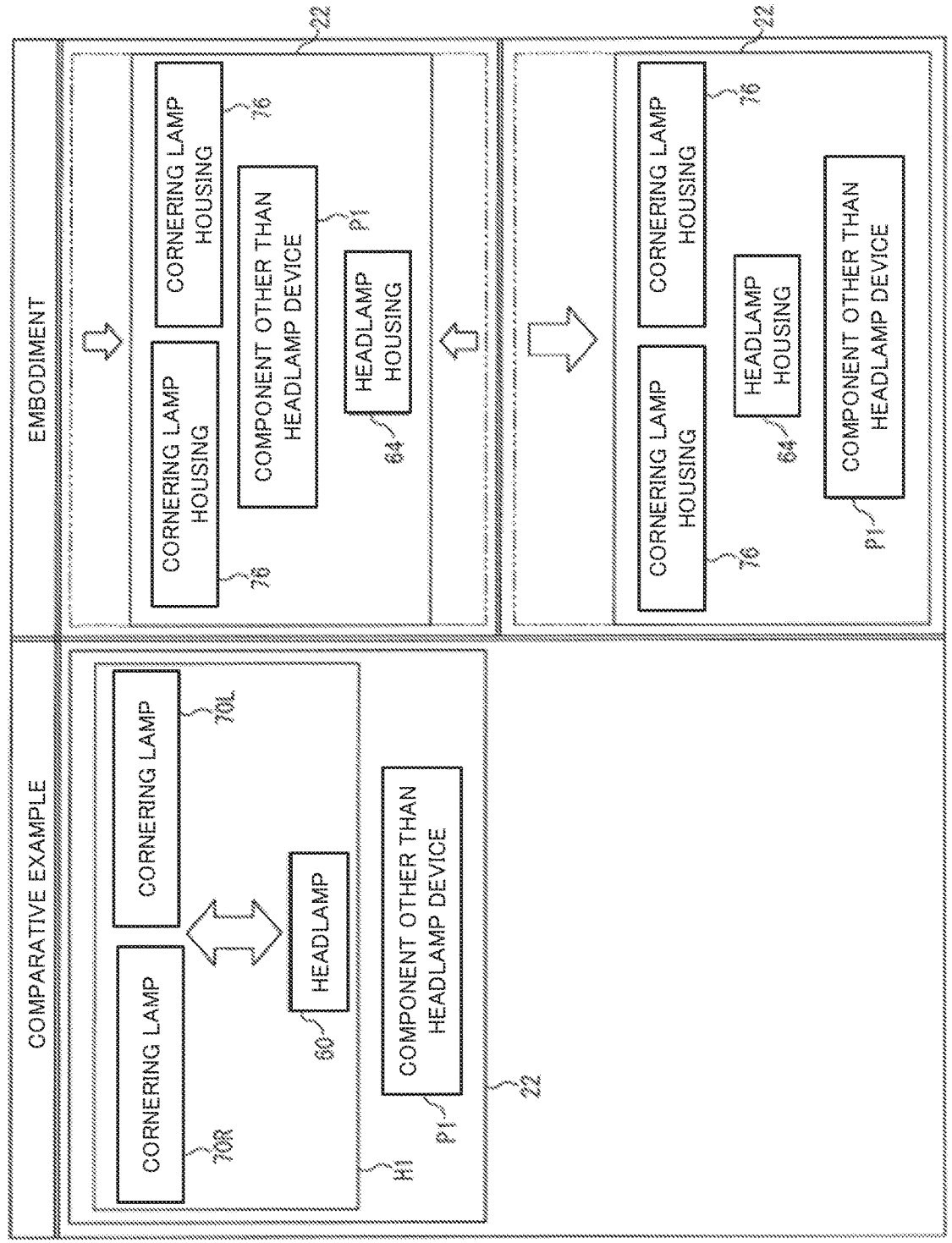
FIG. 2 is an explanatory diagram for comparison between the size of a front cover when the headlamp device according to the embodiment of the present teaching is disposed and the size of a front cover when a headlamp device according to a comparative example is adopted.

The reason why it is possible to allow the front cover 22 to be compact will be explained with reference to FIG. 2. In a headlamp device according to a comparative example, a left-right pair of cornering lamps 70L, 70R and a headlamp 60 are provided with a common housing H1, which involves upsizing of the housing H1. As a result, arranging the housing H1 inside a front cover 22 without interference with a component P1 other than the headlamp device, which represents various components such as electrical system components and brake system components that are also disposed inside the front cover 22, is incompatible with allowing the front cover 22 to be compact.

In a headlamp device 10 according to the embodiment, on the other hand, the cornering lamp housings 76 can be separated from the headlamp housing 64, and therefore each of the cornering lamp housings 76 and the headlamp housing 64 can be downsized to the minimum required size, and additionally the degree of freedom in arranging the cornering lamp housings 76 and the headlamp housing 64 is increased. Accordingly, it is possible to arrange the cornering lamp housings 76 and the headlamp housing 64 at appropriate positions without interference with a component P1 other than the headlamp device disposed inside the front cover 22. To be specific, they may be arranged such that: (1) when viewed in the front direction for the back direction b of the vehicle body 20, each of the cornering lamp housings 76 and the headlamp housing 64 is located upward of the various components P1 such as electrical system components and brake system components disposed inside the front cover 22; or (2) when viewed in the front direction f or the back direction b of the vehicle body 20, either one of the cornering lamp housings 76 or the headlamp housing 64 is/are located upward of the various components P1 such as electrical system components and brake system components disposed inside the front cover 22 while the other of the cornering lamp housings 76 and the headlamp housing 64 is/are located downward of the various components P1 such as electrical system components and brake system components disposed inside the front cover 22. Arranging the cornering lamp housings 76 and the headlamp housing 64 in this manner can allow the front cover 22 to be compact while suppressing concentration of heat emitted from the headlamp light source 62 included in the headlamp 60 and from the cornering lamp light sources 72 included respectively in the pair of cornering lamps 70L, 70R, as compared to the case where the left-right pair of cornering lamps 70L, 70R and the headlamp 60 share the common housing H1.

Specific Example of the Embodiment

Figure 3:
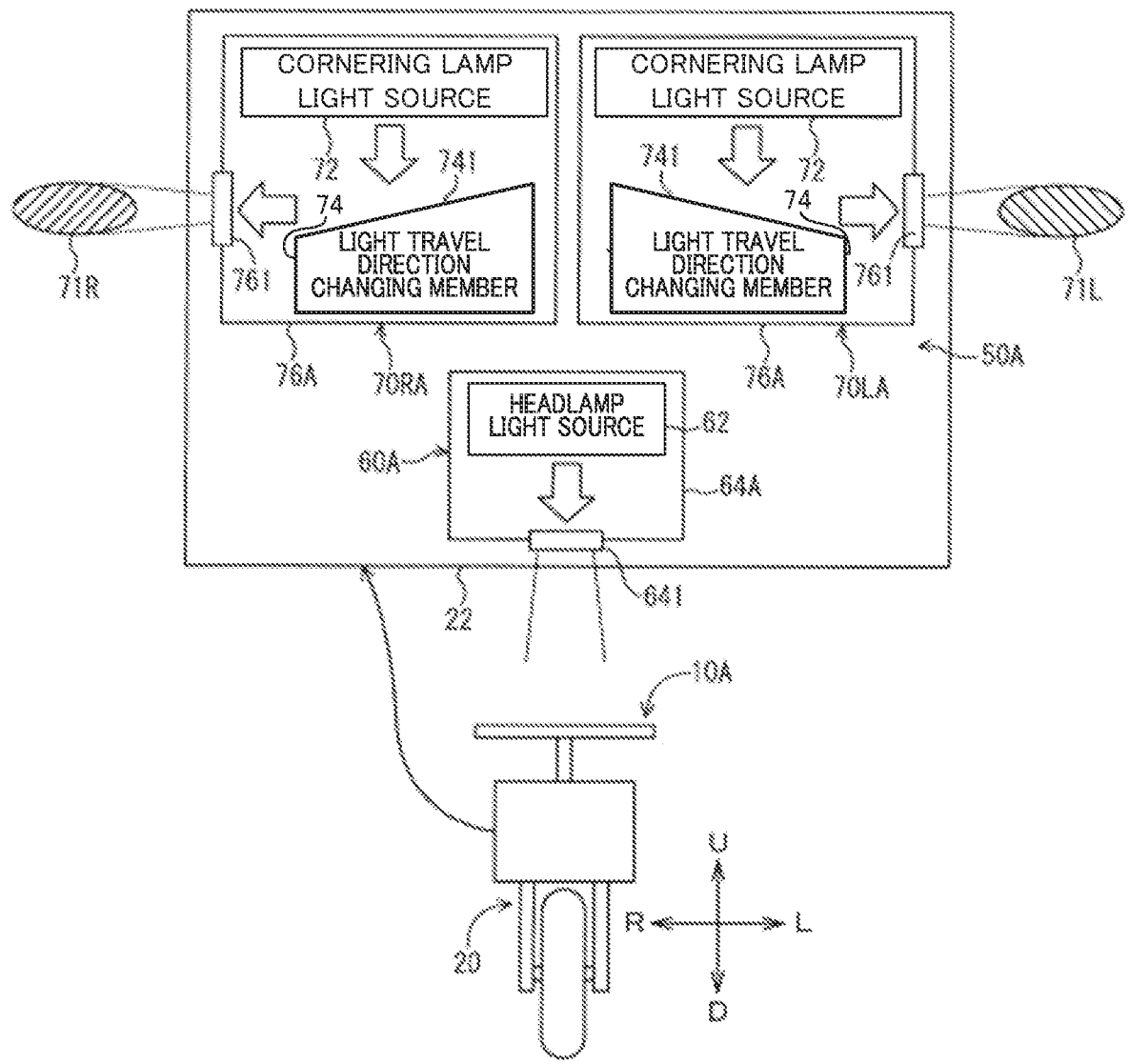
FIG. 3 is an explanatory diagram conceptually showing a leaning vehicle and a headlamp device according to a specific example of the embodiment of the present teaching.

Next, a leaning vehicle 10A and a headlamp device 50A according to a specific example of the embodiment of the present teaching will be described with reference to FIG. 3. FIG. 3 is an explanatory diagram conceptually showing the leaning vehicle 10A and the headlamp device 50A.

The leaning vehicle 10A is a motorcycle. The leaning vehicle 10A includes a vehicle body 20 and the headlamp device 50A. Descriptions of them will follow hereinafter.

The vehicle body 20 leans in a vehicle left direction L when the leaning vehicle 10 turns left. The vehicle body 20 leans in a vehicle right direction R when the leaning vehicle 10 turns right. The vehicle body 20 includes a vehicle body frame. The vehicle body 20 includes a front cover 22.

The headlamp device 50A is supported by the vehicle body 20. When the leaning vehicle 10A turns left, the headlamp device 50A leans in the vehicle left direction L together with the vehicle body 20. When the leaning vehicle 10A turns right, the headlamp device 50A leans in the vehicle right direction R together with the vehicle body 20. The headlamp device 50A is disposed inside the front cover 22.

The headlamp device 50A includes a headlamp 60A and a pair of cornering lamps 70LA, 70RA. Descriptions of them will follow hereinafter.

The headlamp 60A emits light toward the front of the vehicle body 20. The headlamp 60A includes at least one headlamp light source 62 and a headlamp housing 64A. The at least one headlamp light source 62 is, for example, a light emitting diode (LED). The headlamp housing 64A stores the at least one headlamp light source 62 therein.

The headlamp housing 64A includes an outer lens 641. The outer lens 641 is arranged at the front of the at least one headlamp light source 62. The outer lens 641 allows light outputted from the at least one headlamp light source 62 to be transmitted therethrough. The headlamp housing 64A is supported by the vehicle body 20 and/or the front cover 22, for example.

The pair of cornering lamps 70LA, 70RA are arranged side by side in the left-right direction lr of the vehicle body 20. When the leaning vehicle 10A turns left, a first cornering lamp out of the pair of cornering lamps 70LA, 70RA emits light such that a single left-front light emission area 71L visually recognizable by the rider of the leaning vehicle 10 is formed on a road surface at the left-front of the vehicle body 20. In the headlamp device 50A, when the leaning vehicle 10A turns left, the cornering lamp 70LA emits light such that the single left-front light emission area 71L visually recognizable by the rider of the leaning vehicle 10 is formed on a road surface at the left-front of the vehicle body 20.

When the leaning vehicle 10A turns right, a second cornering lamp out of the pair of cornering lamps 70LA, 70RA emits light such that a single right-front light emission area 71R visually recognizable by the rider of the leaning vehicle 10 is formed on a road surface at the right-front of the vehicle body 20. In the headlamp device 50A, when the leaning vehicle 10A turns right, the cornering lamp 70RA emits light such that the single right-front light emission area 71R visually recognizable by the rider of the leaning vehicle 10 is formed on a road surface at the right-front of the vehicle body 20.

Each one of the pair of cornering lamps 70LA, 70RA includes at least one cornering lamp light source 72, a light travel direction changing member 74, and a cornering lamp housing 76A. Descriptions of them will follow hereinafter.

The at least one cornering lamp light source 72 is, for example, a light emitting diode (LED). The at least one cornering lamp light source 72 included in the cornering lamp 70LA is, for example, turned on in response to the lean angle of the vehicle body 20 becoming equal to or greater than a predetermined lean angle while the leaning vehicle 10A is turning left. The at least one cornering lamp light source 72 included in the cornering lamp 70RA is, for example, turned on in response to the lean angle of the vehicle body 20 becoming equal to or greater than a predetermined lean angle while the leaning vehicle 10A is turning right. The turn-on of the at least one cornering lamp light source 72 is controlled by an unillustrated control device, for example.

The light travel direction changing member 74 is disposed corresponding to the at least one cornering lamp light source 72. The light travel direction changing member 74 includes a single light travel direction changing surface 741. The single light travel direction changing surface 741 changes a travel direction of light outputted from the at least one cornering lamp light source 72. More specifically, the single light travel direction changing surface 741 included in the cornering lamp 70LA changes the travel direction of light outputted from the at least one cornering lamp light source 72 such that the single left-front light emission area 71L is formed on a road surface at the left-front of the vehicle body 20 when the leaning vehicle 10A turns left. The single light travel direction changing surface 741 included in the cornering lamp 70RA changes the travel direction of light outputted from the at least one cornering lamp light source 72 such that the single right-front light emission area 71R is formed on a road surface at the right-front of the vehicle body 20 when the leaning vehicle 10A turns right.

The light travel direction changing member 74 is, for example, a reflector that reflects light outputted from the at least one cornering lamp light source 72 toward the front of the leaning vehicle 10A. In this configuration, the light travel direction changing surface 741 included in the light travel direction changing member 74 is a single reflector surface that reflects light outputted from the at least one cornering lamp light source 72 toward the front of the leaning vehicle 10A.

The light travel direction changing surface 741 included in the light travel direction changing member 74 is, for example, arranged downward of the at least one cornering lamp light source 72. In this configuration, the at least one cornering lamp light source 72 outputs light in the down direction of the vehicle body 20. The light travel direction changing surface 741 included in the light travel direction changing member 74 causes the light outputted from the at least one cornering lamp light source 72 in the down direction of the vehicle body 20 to be reflected in the front direction of the leaning vehicle 10A.

The cornering lamp housing 76A stores therein the at least one cornering lamp light source 72 and the light travel direction changing member 74. The cornering lamp housing 76A is provided as a member different from the headlamp housing 64A. The cornering lamp housing 76A is separated from the headlamp housing 64A.

The cornering lamp housing 76A is, for example, supported by the vehicle body 20 and/or the front cover 22. The aspect in which the cornering lamp housing 76A is supported by the vehicle body 20 and/or the front cover 22 encompasses an aspect in which the left cornering lamp housing 76A is supported by the vehicle body 20 and/or the front cover 22 via a bracket, for example.

The cornering lamp housing 76A includes an outer lens 761. The outer lens 761 is arranged at the front of the light travel direction changing member 74. The outer lens 761 allows light outputted from the at least one cornering lamp light source 72, of which travel direction is then changed by the light travel direction changing surface 741, to be transmitted therethrough.

In the leaning vehicle 10A having the above-described configuration, like the leaning vehicle 10, it is possible to allow the front cover 22 to be compact while suppressing concentration of heat emitted from the headlamp light source 62 included in the headlamp 60 and from the cornering lamp light sources 72 included in the pair of cornering lamps 70L, 70R.

Variation 1 of the Embodiment

Figure 4:
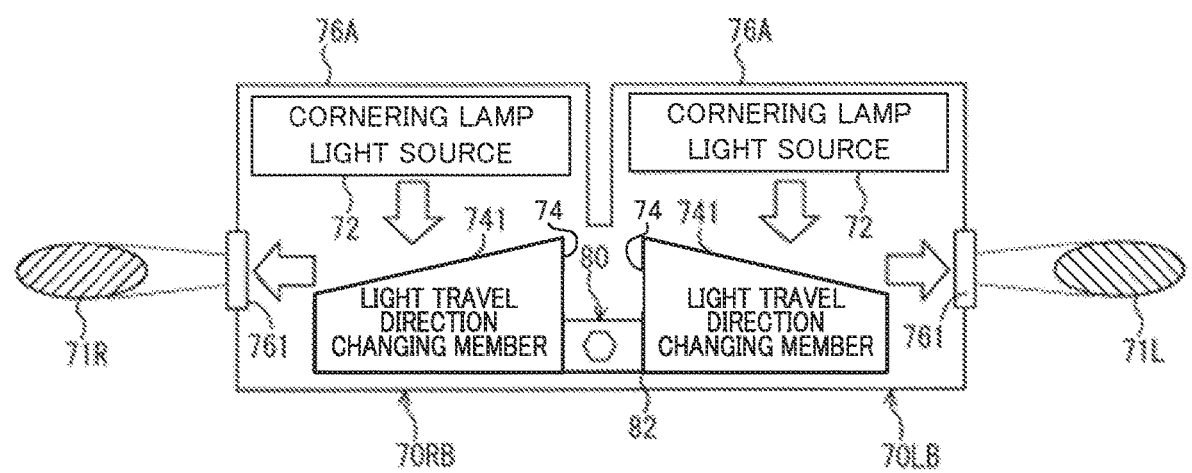
FIG. 4 is an explanatory diagram conceptually showing a left-right pair of cornering lamps included in a headlamp device according to variation 1 of the embodiment of the present teaching.

Variation 1 of the embodiment of the present teaching will now be described with reference to FIG. 4. FIG. 4 is an explanatory diagram conceptually showing a pair of cornering lamps 70LB, 70RB included in a headlamp device according to the variation 1 of the embodiment of the present teaching.

The pair of cornering lamps 70LB, 70RB are arranged side by side in the left-right direction lr of the vehicle body 20. The pair of cornering lamps 70LB, 70RB are different from the pair of cornering lamps 70LA, 70RA in that a cornering lamp housing 76A included in the cornering lamp 70LB and a cornering lamp housing 76A included in the cornering lamp 70RB are integrated.

The pair of cornering lamps 70LB, 70RB are different from the pair of cornering lamps 70LA, 70RA in that an aiming mechanism 80 is additionally provided. That is, the pair of cornering lamps 70LB, 70RB further include an aiming mechanism 80. The aiming mechanism 80 adjusts a travel direction of light that is emitted so as to form a single left-front light emission area 71L as well as a travel direction of light that is emitted so as to form a single right-front light emission area 71R.

The aiming mechanism 80, for example, includes a bracket 82 that supports light travel direction changing members 74 included respectively in the pair of cornering lamps 70LB, 70RB. With this configuration, how the aiming mechanism 80 adjusts the travel direction of light that is emitted so as to form the single left-front light emission area 71L as well as the travel direction of light that is emitted so as to form the single right-front light emission area 71R encompasses changing a manner in which the bracket 82 is attached to a cornering lamp housing that integrates the cornering lamp housing 76A included in the cornering lamp 70LB with the cornering lamp housing 76A included in the cornering lamp 70RB.

Variation 2 of the Embodiment

Figure 5:
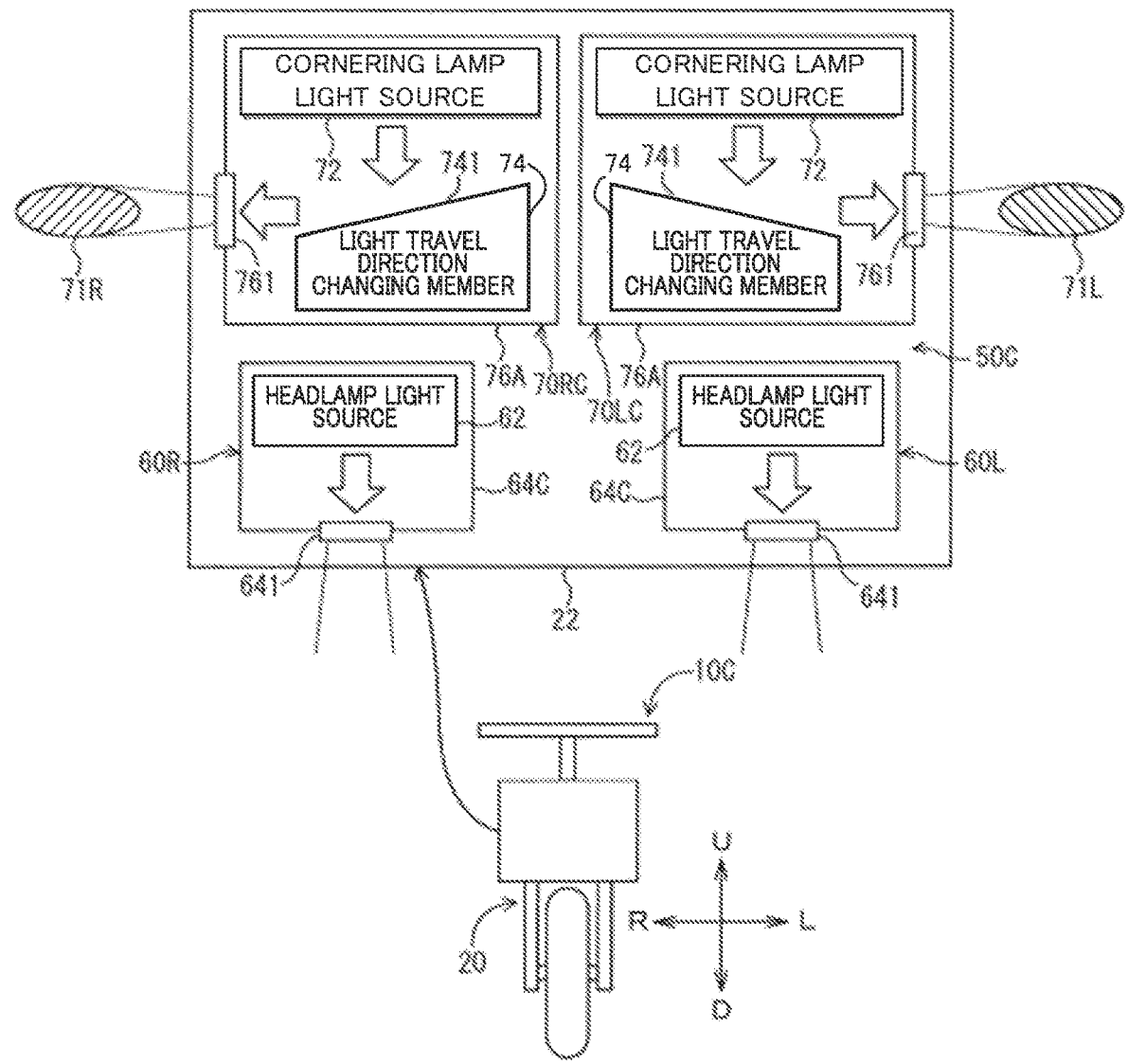
FIG. 5 is an explanatory diagram conceptually showing a leaning vehicle and a headlamp device according to variation 2 of the embodiment of the present teaching.

Variation 2 of the embodiment of the present teaching will now be described with reference to FIG. 5. FIG. 5 is a conceptual diagram showing a leaning vehicle 10C and a headlamp device 50C according to the variation 2 of the embodiment of the present teaching.

The headlamp device 50C is different from the headlamp device 50A in that the headlamp 60A is replaced with a pair of headlamps 60L, 60R arranged side by side in the left-right direction lr of the vehicle body 20.

Each of the pair of headlamps 60L, 60R emits light in the front direction of the vehicle body 20. Each of the pair of headlamps 60L, 60R includes at least one headlamp light source 62 and a headlamp housing 64C. The at least one headlamp light source 62 is, for example, a light emitting diode (LED). The headlamp housing 64C stores the at least one headlamp light source 62 therein.

The headlamp housing 64C includes an outer lens 641. The outer lens 641 is arranged at the front of the at least one headlamp light source 62. The outer lens 641 allows light outputted from the at least one headlamp light source 62 to be transmitted therethrough. The headlamp housing 64C is, for example, supported by the vehicle body 20 and/or the front cover 22.

When viewed in the front direction f or the back direction b of the vehicle body 20, a pair of cornering lamps 70LC, 70RC and the pair of headlamps 60L, 60R are arranged one above the other in the up-down direction ud of the vehicle body 20. In the example shown in FIG. 5, the pair of cornering lamps 70LC, 70RC are arranged upward of the pair of headlamps 60L, 60R when viewed in the front direction for the back direction b of the vehicle body 20. The lower ends of the pair of cornering lamps 70LC, 70RC are located upward of the upper ends of the pair of headlamps 60L, 60R.

Figure 6:
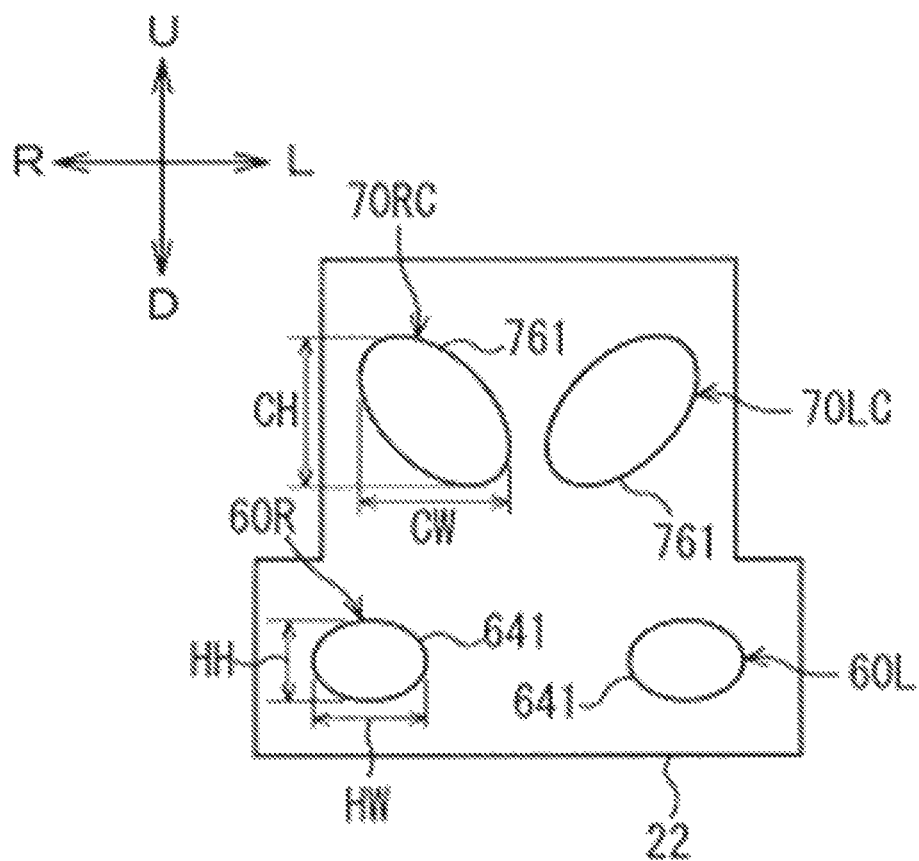
FIG. 6 is an explanatory diagram conceptually showing the positional relationship between outer lenses included respectively in a left-right pair of cornering lamps and headlamp outer lenses included respectively in the left-right pair of cornering lamps in the headlamp device according to the variation 2 of the embodiment of the present teaching.

Next, the relationship between the outer lens 761 included in each of the pair of cornering lamps 70LC, 70RC and the outer lens 641 included in each of the pair of headlamps 60L, 60R will be described with reference to FIG. 6.

A length CW of the outer lens 761 in the left-right direction lr of the vehicle body 20 is larger than a length HW of the outer lens 641 in the left-right direction lr of the vehicle body 20.

A length CH of the outer lens 761 in the up-down direction ud of the vehicle body 20 is larger than a length HH of the outer lens 641 in the up-down direction ud of the vehicle body 20.

The cornering lamp 70LC out of the pair of cornering lamps 70LC, 70RC has the outer lens 761 of which right end is located closer to the center of the vehicle body 20 in the left-right direction lr than the right end of the outer lens 641 included in the headlamp 60L out of the pair of headlamps 60L, 60R is.

The cornering lamp 70RC out of the pair of cornering lamps 70LC, 70RC has the outer lens 761 of which left end is located closer to the center of the vehicle body 20 in the left-right direction lr than the left end of the outer lens 641 included in the headlamp 60R out of the pair of headlamps 60L, 60R is.

The cornering lamp 70LC out of the pair of cornering lamps 70LC, 70RC has the outer lens 761 of which left end is located closer to the center of the vehicle body 20 in the left-right direction lr than the left end of the outer lens 641 included in the headlamp 60L out of the pair of headlamps 60L, 60R is.

The cornering lamp 70RC out of the pair of cornering lamps 70LC, 70RC has the outer lens 761 of which right end is located closer to the center of the vehicle body 20 in the left-right direction lr than the right end of the outer lens 641 included in the headlamp 60R out of the pair of headlamps 60L, 60R is.

Figure 7:
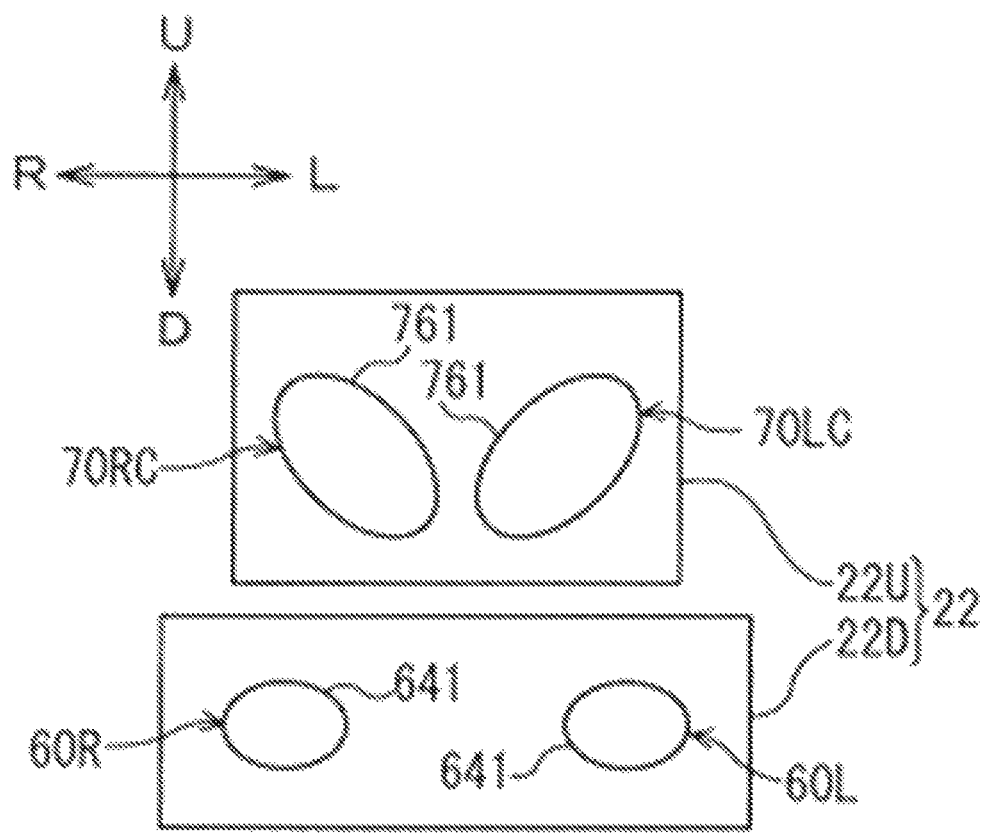
FIG. 7 is an explanatory diagram conceptually showing a front cover adopted in a leaning vehicle equipped with a headlamp device according to a variation of the embodiment of the present teaching.

The front cover 22 may include an upside front cover 22U and a downside front cover 22D as shown in FIG. 7, for example.

The downside front cover 22D is separated from the upside front cover 22U.

The downside front cover 22D is arranged downward of the upside front cover 22U when viewed in the front direction for the back direction b of the vehicle body 20.

The pair of headlamps 60L, 60R are disposed inside the downside front cover 22D. The pair of cornering lamps 70LC, 70RC are disposed inside the upside front cover 22U.

At least either one of the upside front cover 22U or the downside front cover 22D may be composed of two or more split front covers arranged side by side in the left-right direction of the vehicle body 20, for example.

OTHER EMBODIMENTS

The embodiments and variations described and/or illustrated herein are for facilitating understanding of the present disclosure, and do not limit the concept of the present disclosure. The foregoing embodiments and variations can be changed or modified without departing from the gist thereof.

The gist encompasses equivalent elements, corrections, deletions, combinations (for example, combinations of features across embodiments and variations), improvements, and/or changes that can be recognized by those skilled in the art based on the embodiments disclosed herein. The limitations of the appended claims should be broadly interpreted based on terms used in the appended claims, and should not be limited by the embodiments and variations described herein or in the prosecution of the present application. The embodiments and variations should be construed as non-exclusive. For example, the terms "preferably" and "may" as used herein are non-exclusive, respectively meaning "preferable, but not limited to this" and "may be, but not limited to this".

In the variation 2 of the embodiment described above, the pair of headlamps 60L, 60R may be arranged upward of the pair of cornering lamps 70LC, 70RC.

In the variation 2 of the embodiment described above, the headlamp 60 may be adopted instead of the pair of headlamps 60L, 60R.

DESCRIPTION OF THE REFERENCE SIGNS 10 leaning vehicle
20 vehicle body
50 headlamp device
60 headlamp
70 left-right pair of cornering lamps
71L single left-front light emission area
71R single right-front light emission area
72 cornering lamp light source
74 light travel direction changing member
741 single light travel direction changing surface
76 cornering lamp housing

The invention claimed is:

1. A leaning vehicle comprising:
a vehicle body including a front cover, the vehicle body being configured to lean in a left direction in turning left and lean in a right direction in turning right; and
a headlamp device that is supported by the vehicle body so that the headlamp device leans in the left direction together with the vehicle body in turning left and leans in the right direction together with the vehicle body in turning right, the headlamp device being disposed inside the front cover, the headlamp device including:
at least one headlamp that emits light in a front direction of the vehicle body; and
a pair of cornering lamps that emit light, to thereby form
a single left-front light emission area visually recognizable by a rider of the leaning vehicle on a road surface at left-front of the vehicle body when the leaning vehicle turns left, and
a single right-front light emission area visually recognizable by the rider of the leaning vehicle on the road surface at right-front of the vehicle body when the leaning vehicle turns right, wherein
each of the at least one headlamp includes
at least one headlamp light source, and
a headlamp housing that stores the at least one headlamp light source therein, the headlamp housing being arranged inside the front cover so as to allow light outputted from the at least one headlamp light source to be emitted; and
each of the pair of cornering lamps includes
at least one cornering lamp light source,
a light travel direction changing member disposed corresponding to the at least one cornering lamp light source, the light travel direction changing member having a single light travel direction changing surface that changes a travel direction of light outputted from the at least one cornering lamp light source, and
a cornering lamp housing that stores therein the at least one cornering lamp light source and the light travel direction changing member, the cornering lamp housing being arranged inside the front cover so as to allow light outputted from the at least one cornering lamp light source, of which the travel direction is changed by the single light travel direction changing surface, to be emitted, wherein
the cornering lamp housing and the headlamp housing are separate from each other.

2. The leaning vehicle according to claim 1, wherein
the pair of cornering lamps further include an aiming mechanism that adjusts the travel direction of light that is outputted from the at least one cornering lamp light source in each of the pair of cornering lamps, and
the cornering lamp housings of the pair of cornering lamps are integrated with each other.

3. The leaning vehicle according to claim 1, wherein when viewed in the front direction or a back direction of the vehicle body, the pair of cornering lamps and the at least one headlamp are arranged one above the other, without overlapping, in an up-down direction of the vehicle body.

4. The leaning vehicle according to claim 3, wherein when viewed in the front or back direction of the vehicle body, the pair of cornering lamps are above the at least one headlamp.

5. The leaning vehicle according to claim 3, wherein
the pair of cornering lamps are arranged side by side in a left-right direction of the vehicle body, and
the at least one headlamp comprises a pair of headlamps that are arranged side by side in the left-right direction of the vehicle body.

6. The leaning vehicle according to claim 5, wherein:
each of the pair of cornering lamps further includes a cornering lamp outer lens that is disposed corresponding to the light travel direction changing member, the cornering lamp outer lens allowing light outputted from the at least one cornering lamp light source, of which the travel direction is changed by the single light travel direction changing surface, to be transmitted therethrough;
each of the pair of headlamps further includes a headlamp outer lens that allows light outputted from the at least one headlamp light source in said each headlamp to be transmitted therethrough; and
a length of the cornering lamp outer lens is larger than a length of the headlamp outer lens, in the left-right direction of the vehicle body.

7. The leaning vehicle according to claim 6, wherein
the pair of cornering lamps are respectively a left cornering lamp and a right cornering lamp,
the pair of headlamps are respectively a left headlamp and a right headlamp,
a right end of the cornering lamp outer lens included in the left cornering lamp is located closer to a center of the vehicle body in the left-right direction than a right end of the headlamp outer lens included in the left headlamp is, and
a left end of the cornering lamp outer lens included in the right cornering lamp is located closer to the center of the vehicle body in the left-right direction than a left end of the headlamp outer lens included in the right headlamp is.

8. The leaning vehicle according to claim 7, wherein
a left end of the cornering lamp outer lens included in the left cornering lamp is located closer to the center of the vehicle body in the left-right direction than a left end of the headlamp outer lens included in the left headlamp is, and
a right end of the cornering lamp outer lens included in the right cornering lamp is located closer to the center of the vehicle body in the left-right direction than a right end of the headlamp outer lens included in the right headlamp is.

9. The leaning vehicle according to claim 3, wherein:
the front cover includes
   an upside front cover, and
   a downside front cover separate from the upside front cover, the downside front cover being arranged downward of the upside front cover when viewed in the front direction or the back direction of the vehicle body; and
the at least one headlamp and the pair of cornering lamps are disposed inside the upside front cover and the downside front cover, or respectively disposed inside the downside front cover and the upside front cover.

10. The leaning vehicle according to claim 1, wherein
the single left-front light emission area that is formed on the road surface at left-front of the vehicle body when the leaning vehicle turns left becomes larger as the lean angle of the vehicle body increases, and
the single right-front light emission area that is formed on the road surface at right-front of the vehicle body when the leaning vehicle turns right becomes larger as the lean angle of the vehicle body increases.

\* \* \* \* \*